Patented Aug. 3, 1926.

1,594,746

UNITED STATES PATENT OFFICE.

DORIS SOPHIE MUNN, OF GOUROCK, SCOTLAND.

ARTIFICIAL FLOWERS.

No Drawing. Application filed July 22, 1925, Serial No. 45,430, and in Great Britain March 21, 1925.

This invention relates to the manufacture of artificial flowers, and has for its object to produce an article which shall be more realistic and durable than existing articles of this character, is water-proof and consequently hygienic because it is washable and can retain a perfume.

Hitherto artificial flowers have been made from silk, paper, waxed fabrics, and so forth, and usually are poor imitations of the real flower, fading easily and are very fragile, never being capable of withstanding wet.

The essence of the present invention resides in making said flowers from indiarubber. In combination a natural scent or any other suitable perfume applicable to the particular flower may be applied. The india-rubber chosen is very thin sheeting which, at the present date, is produced in a great variety of colours, tints and shades. The texture very closely resembles that of flower-petals, and the material as a whole gives a very close resemblance to the actual flowers. In making, the petals may be either stamped or cut out singly or in groups radiating from a centre and bunched together and finished off by vulcanizing water-proof thread india-rubber solution or the like.

An important step in process of manufacture is imparting to the petals, leaves, or other elements the requisite curl or other shape in a permanent manner, or in other words to impart a pliant rigidity or stiffening at required areas to the element which normally hangs limply. For instance, one form of petal may be required to be upstanding in dished formation, the corresponding element of a natural flower being thicker near the heart or centre of the flower and gradually thinning towards outer edge or tip.

I attain this natural-looking result by coating a solution of rubber in benzene or other solvent on to the petal or the like, graduating the thickness of the coat or the number of applications of the coat according to requirements.

As one example, I may start from the end of a petal (which is to be at the flower centre) and carefully brush a coat of the solution towards the outer edge gradually thinning off until at or about the transverse centre line of the petal, the coat becomes a film of infinitesimal thickness vanishing to nothing. The thickly coated end then becomes thick and "meaty" similar to the natural article, whilst the petal gradually merges off to the delicately thin outer edge required. On drying, the petal assumes the curl aimed at, and this naturally-forming curl or shape can be modified by manipulation during the drying.

It is to be understood that the application of the rubber solution may be modified according to the flower being designed (i. e. the final shape sought). Turpentine may be lightly brushed over the solutioned area on to the non-solutioned area the more to gently or "vanishingly" merge the two areas. More than one area on the petal, leaf or other element may be so treated.

I select a rubber solution of great clarity and purity for this work so that the delicate shades of rubber (or colours applied to the rubber) are not altered.

In some cases different shades and colours on the one element (e. g. a petal) are required, I may choose a sheet of rubber sheeting with one shade to form my basic colour, and work on that with appropriate dyes or colourings. In this respect I find that the use of turpentine as a vehicle for the colouring matter, is beneficial in many instances, depending on the type of dye or colouring matter in use, and also whether the turps will affect (adversely or otherwise) the configuration to be given or already given by the solution-coating aforesaid.

The petals or other elements (especially leaves) may be reinforced by fine wires or the like, which can be caused to follow lines where natural veins and markings would appear. Such wires could be embedded in the rubber, coated with a rib of solution, or covered by a thin strip of rubber applied by solution or other adhesive. Such markings may also be formed on the rubber elements prior to vulcanization.

The petals and other elements are assembled together to form the flower, either by stitching, vulcanizing or by means of adhesive compositions, or a combination of these expedients, and attached to a covered wire or other stalk. A base (which may be a moulded member) in the form of the calyx can be used to heighten the effect.

After the artificial flower is formed to closely resemble the natural flower it is rinsed in water or the like for a sufficient time to remove traces or excess amount of the preparation.

In the heart of the flower made from rubber can be embedded a small sponge, or pad of cotton wool, or blown rubber or other suitable material which is saturated with the perfume peculiar to that particular natural flower represented, or the perfume may be impregnated in the rubber during the process of vulcanization or otherwise.

I claim:—

1. Artificial flowers composed of petals of sheet india rubber coated with a rubber solution whereby the petals are curled and stiffened.

2. Artificial flowers composed of petals of sheet india rubber having portions thereof coated with a rubber solution whereby the petals are curled and stiffened.

3. An artificial flower composed of petals of sheet india rubber the petals being coated with a rubber solution varying in thickness from the inner toward the outer edge of the petal whereby a permanent curl is imparted to the petal.

4. A process of making artificial flowers which consists in forming petals from sheet india rubber, then coating said petals with a rubber solution on one face thereof to impart a curl to the petal.

5. A process of making artificial flowers which consists in forming petals from sheet india rubber, then coating said petals with a rubber solution on one face thereof to impart a curl to the petal and fixing the curl so formed by applying a coating of rubber solution on requisite areas of the petal.

6. A process of forming rubber flowers which consists in constructing petals of sheet india rubber, then coating one face of the petals with a rubber solution thereby causing the petals to curl, then applying a coating of rubber solution to fix the curl in the petal, said second coating being graduated in thickness from the inner to the outer portion of the petal.

7. A process of making artificial flowers which consists in forming petals from sheet india rubber, then coating said petals with a rubber solution on one face thereof to impart a curl to the petal, said solution having mixed therewith an appropriate paint, whereby coloring is applied to the petals simultaneously with the curling.

In testimony whereof I have affixed my signature hereto this 9th day of July, 1925.

DORIS SOPHIE MUNN.